United States Patent
Miyagawa et al.

(10) Patent No.: US 9,521,591 B2
(45) Date of Patent: Dec. 13, 2016

(54) COMMUNICATION SYSTEM FOR LTE NETWORK

(71) Applicants: Yusuke Miyagawa, Tokyo (JP); Takayuki Kido, Tokyo (JP); Takuo Akimoto, Tokyo (JP); Yuki Nakanishi, Tokyo (JP); Yasuhiro Watanabe, Tokyo (JP)

(72) Inventors: Yusuke Miyagawa, Tokyo (JP); Takayuki Kido, Tokyo (JP); Takuo Akimoto, Tokyo (JP); Yuki Nakanishi, Tokyo (JP); Yasuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 14/405,871

(22) PCT Filed: Jan. 21, 2013

(86) PCT No.: PCT/JP2013/051045
§ 371 (c)(1),
(2) Date: Dec. 5, 2014

(87) PCT Pub. No.: WO2013/183316
PCT Pub. Date: Dec. 12, 2013

(65) Prior Publication Data
US 2015/0304895 A1 Oct. 22, 2015

(30) Foreign Application Priority Data
Jun. 7, 2012 (JP) .................................. 2012-129835

(51) Int. Cl.
*H04W 36/00* (2009.01)
*H04W 68/12* (2009.01)
*H04W 48/18* (2009.01)

(52) U.S. Cl.
CPC ......... *H04W 36/0022* (2013.01); *H04W 48/18* (2013.01); *H04W 68/12* (2013.01)

(58) Field of Classification Search
None
See application file for complete search history.

(56) References Cited

U.S. PATENT DOCUMENTS

2006/0276192 A1 12/2006 Dutta et al.
2010/0130171 A1* 5/2010 Palanigounder .... H04L 63/0823
455/411

(Continued)

FOREIGN PATENT DOCUMENTS

JP 2008-546252 A 12/2008
JP 2011-233987 A 11/2011

(Continued)

OTHER PUBLICATIONS

International Search Report corresponding to PCT/JP2013/051045, dated Feb. 12, 2013 (5 pages).

(Continued)

*Primary Examiner* — Erika Washington
(74) *Attorney, Agent, or Firm* — Wilmer Cutler Pickering Hale and Dorr LLP

(57) ABSTRACT

When a voice call is made from or received by UE (100) that is present in both 3G femto area (101) and LTE area (103), line switching for making a voice call or receiving a voice call is performed from MME (112) to P-CSCF (108) by using a predetermined protocol.

4 Claims, 13 Drawing Sheets

(56) References Cited

U.S. PATENT DOCUMENTS

| | | |
|---|---|---|
| 2010/0150110 A1 | 6/2010 | Dutta et al. |
| 2011/0188448 A1 | 8/2011 | Griot et al. |
| 2011/0191430 A1 | 8/2011 | Griot et al. |
| 2013/0188601 A1* | 7/2013 | Sun .................. H04W 36/14 370/331 |

FOREIGN PATENT DOCUMENTS

| | | |
|---|---|---|
| WO | WO-2007/015068 A1 | 2/2007 |
| WO | WO-2007/038272 A2 | 4/2007 |
| WO | WO-2010/020417 A2 | 2/2010 |
| WO | WO-2011/019772 A2 | 2/2011 |
| WO | WO-2012/060421 A1 | 5/2012 |
| WO | WO-2012/176870 A1 | 12/2012 |

OTHER PUBLICATIONS

3GPP TS 23.272 V1.0.0, "Technical Specification Group Services and System Aspects;" Circuit Switched Fallback in Evolved Packet System; Stage 2, (Release 8) Mar. 2008, pp. 1-18.

Extended European Search Report issued in corresponding to European Application No. 13800340.5, dated Apr. 7, 2016, 13 pages.

Martin Sauter "Long Term Evolution (LTE)" in: "From GSM to LTE", Dec. 24, 2010, John Wiley & Sons, XP055117639, pp. 205-276.

* cited by examiner

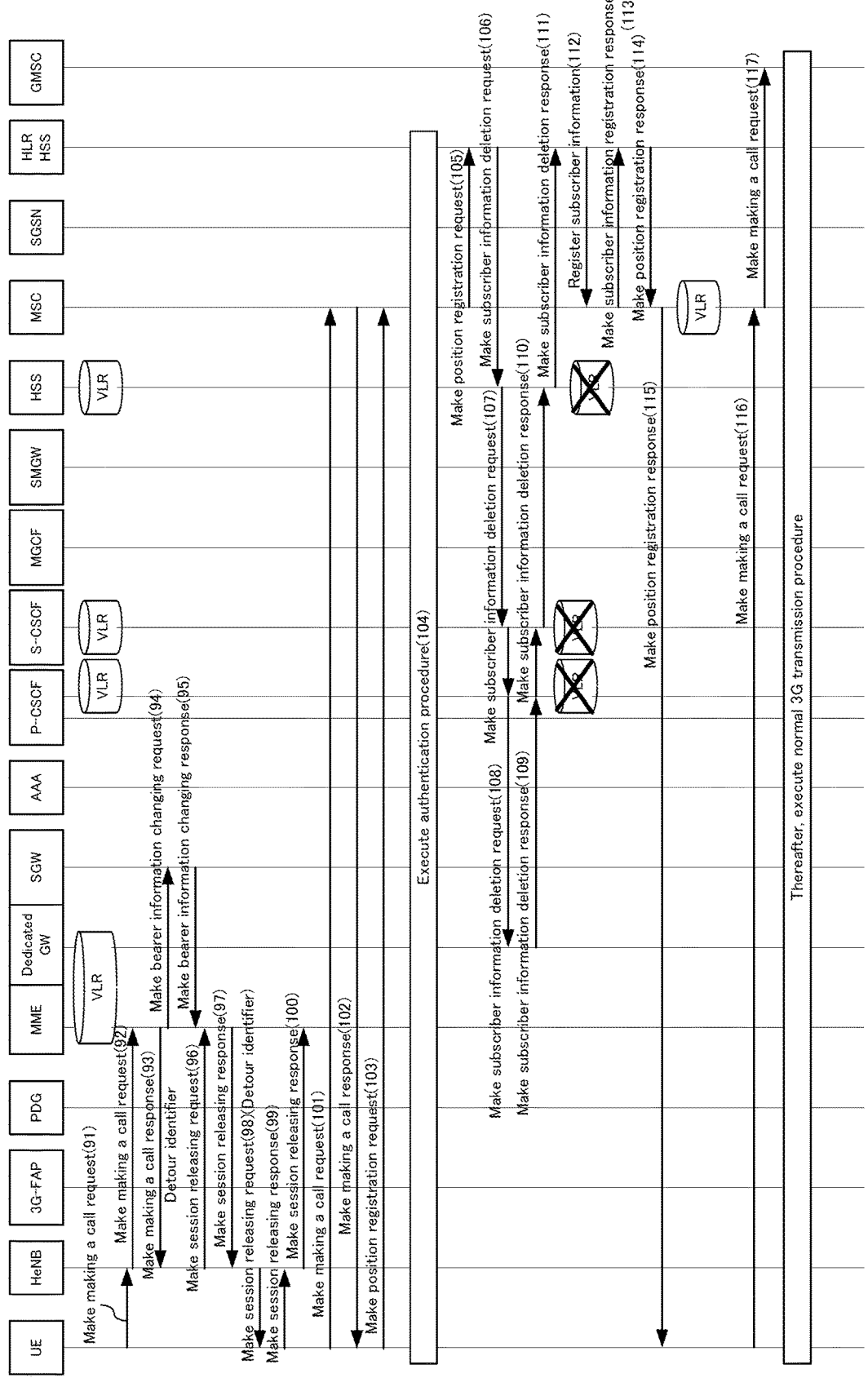

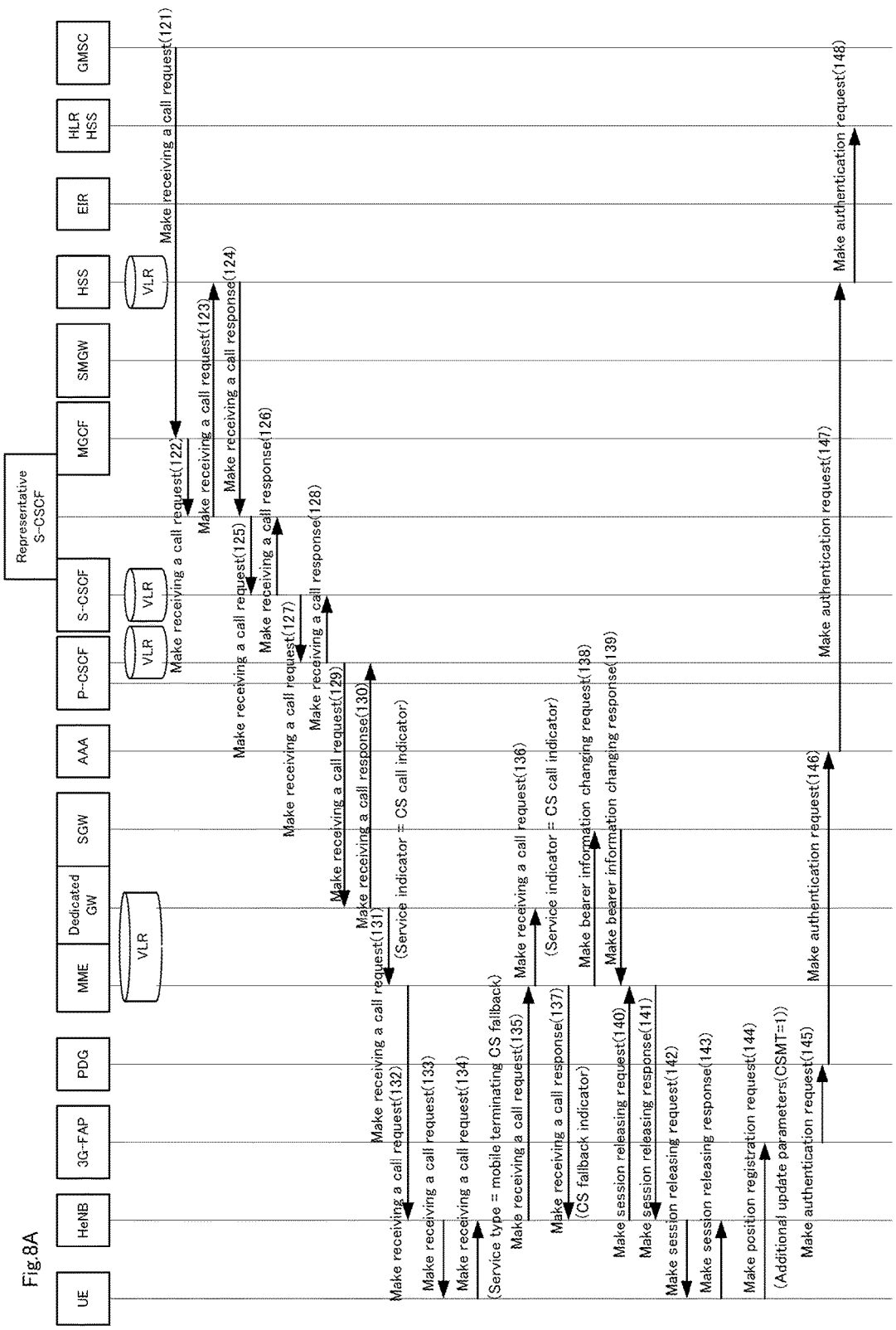

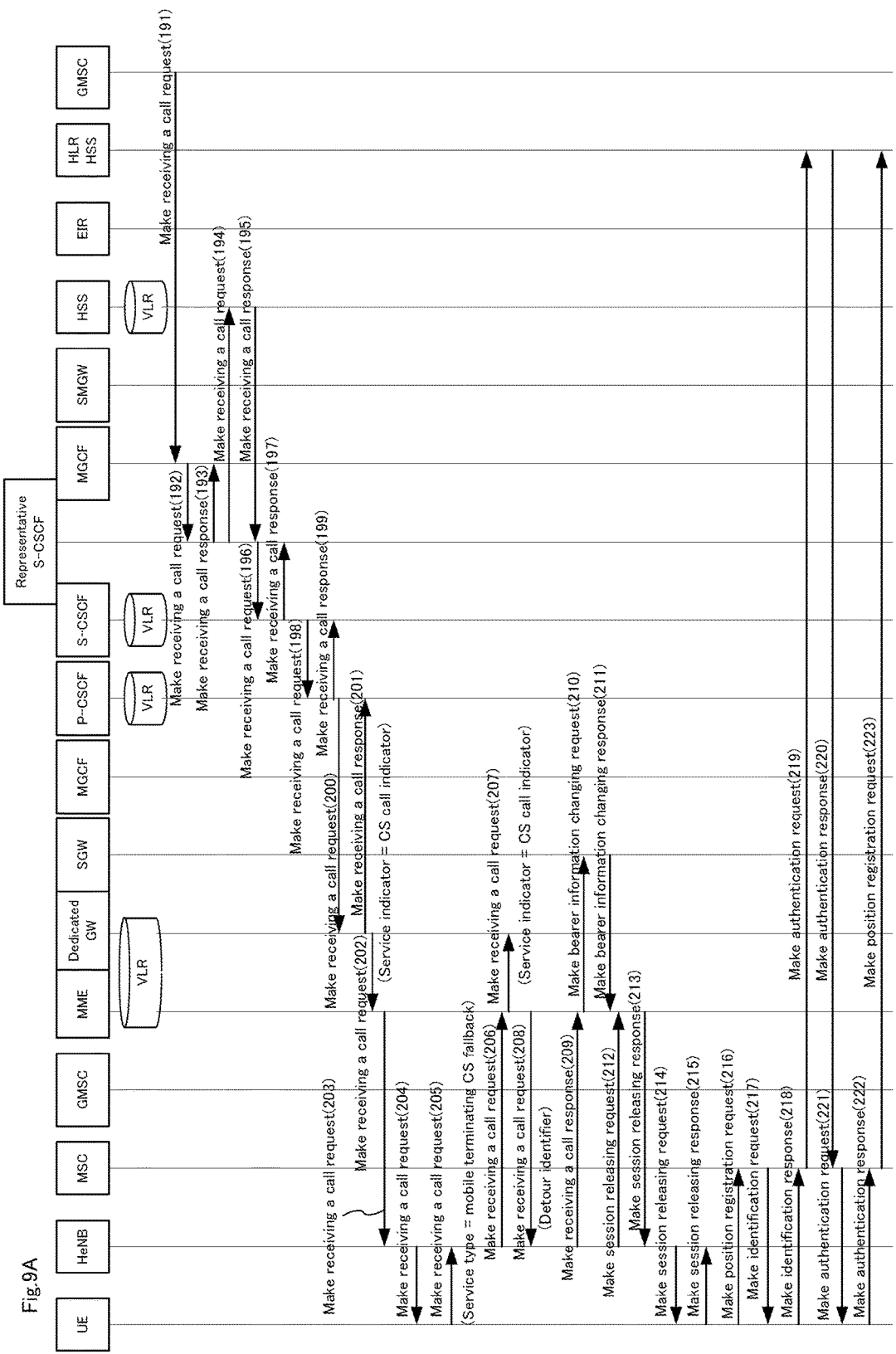

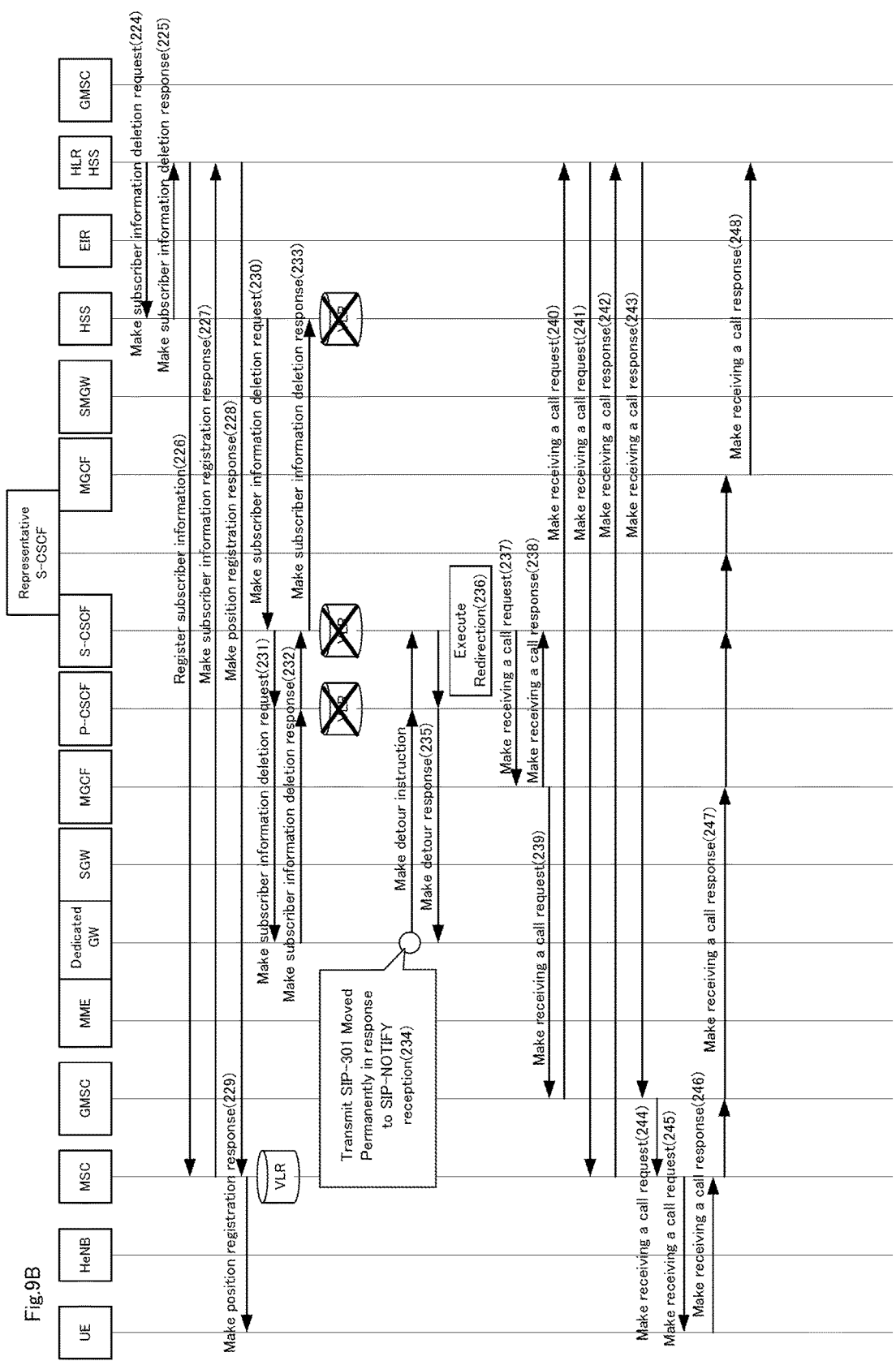

COMMUNICATION SYSTEM FOR LTE NETWORK

CROSS-REFERENCE TO RELATED APPLICATIONS

This application is a national stage application of International Application No. PCT/JP2013/051045 entitled "Communication System," filed on Jan. 21, 2013, which claims the benefit of the priority of Japanese Patent Application No. 2012-129835, filed on Jun. 7, 2012, the disclosures of each of which are hereby incorporated by reference in their entirety.

TECHNICAL FIELD

The present invention relates to a communication system that performs voice communication, a control node, a conversion server, and a communication method.

BACKGROUND ART

Recently, there has been introduced a LTE (Long Term Evolution) as a new mobile terminal communication standard. In the LTE, a conventional line switching function (voice calling function) is not provided.

Thus, when the mobile terminal having a LTE function is present in a 3G (3rd Generation) mobile network (mobile phone line) and a voice call is received by the mobile terminal, a technology for switching the reception of the voice call from the LTE network to the 3G network to achieve voice calling may be used (e.g., refer to Nonpatent Literature 1). The same technology may be used when a voice call is made from the mobile terminal This switching is referred to as CSFB (Circuit Switched FallBack).

Recently, there has been developed a 3G femto base station that is a 3G femto cell (femto area) having a communication area narrower than that of a general 3G wireless base station. The 3G femto base station is a compact wireless base station generally having the range of a radius of several tens of meters set as a communication area and installed indoors, for example, in an office.

CITATION LIST

Nonpatent Literature 1: 3GPP TS23.272 V1.0.0

SUMMARY OF INVENTION

Problems to be Solved

When the mobile terminal having the LTE function is present in the 3G femto area and a voice call is received by the mobile terminal, or when a voice call is transmitted from the mobile terminal, there is a problem of inhibited voice calling because the aforementioned CSFB procedure is not established between the LTE and the 3G femto.

It is therefore an object of the present invention to provide a communication system, a control node, a conversion server, and a communication method that solve the aforementioned problem.

Solution to Problem

According to the present invention, a communication system includes: a LTE access network including a control node, an eNB, and a HeNB; and a 3G femto network including an IMS and a femto cell base station. The IMS includes virtual MSC means for causing the control node to recognize a server in the IMS as a MSC during communication with the control node. The virtual MSC means transfers and receives a message of control information for line switching with the control node during the line switching between the eNB and the femto cell base station, and between the HeNB and the femto cell base station.

According to the present invention, a control node of a LTE access network includes: an interface control unit that controls a switching interface for performing line switching from the control node to an IMS with the IMS of a 3G femto network when a voice call is made from a 3G/LTE dual terminal present in both areas, namely, a communication area of the 3G femto network and a communication area of a LTE network, or when a voice call is received by the 3G/LTE dual terminal; and a SIP control unit that controls the line switching with the IMS by using a SIP.

According to the present invention, a conversion server includes: an interface control unit that controls a switching interface for performing line switching from a control node to an IMS of a 3G femto network with the control node of a LTE access network when a voice call is made from a 3G/LTE dual terminal present in both areas, namely, a communication area of the 3G femto network and a communication area of a LTE network, or when a voice call is received by the 3G/LTE dual terminal; and a SIP control unit that controls the line switching with the IMS by using a SIP.

According to the present invention, a communication method includes the steps of: determining whether a voice call has been made from a 3G/LTE dual terminal present in both areas, namely, a communication area of a 3G femto network and a communication area of a LTE network, or whether a voice call has been received by the 3G/LTE dual terminal; and when it is determined that the voice call has been made or that the voice call has been received, performing line switching of the making a voice call or the receiving a voice call from a control node of a LTE access network to an IMS of the 3G femto network by using a predetermined protocol.

Effects of Invention

As described above, according to the present invention, when a voice call is made from the 3G/LTE dual terminal present in the 3G femto area, or when a voice call is received by the 3G/LTE dual terminal, voice calling can be performed.

BRIEF DESCRIPTION OF DRAWINGS

FIG. 7 A sequential diagram illustrating CSFB processing to a 3G network when a voice call is made from a UE present in a 3G area according to the communication method in the communication system illustrated in FIG. 1.

FIG. 8A A sequential diagram illustrating CSFB processing to the 3G femto network when a voice call is received by the UE that is present in the 3G femto area according to the communication method in the communication system illustrated in FIG. 1.

FIG. 9A A sequential diagram illustrating CSFB processing to the 3G network when a voice call is received by the UE that is present in the 3G area according to the communication method in the communication system illustrated in FIG. 1.

FIG. 9B A sequential diagram illustrating CSFB processing to the 3G network when the voice call is received by the UE that is present in the 3G area according to the communication method in the communication system illustrated in FIG. 1.

DESCRIPTION OF EMBODIMENTS

Hereinafter, the embodiments of the present invention will be described with reference to the drawings.

Figure 1:
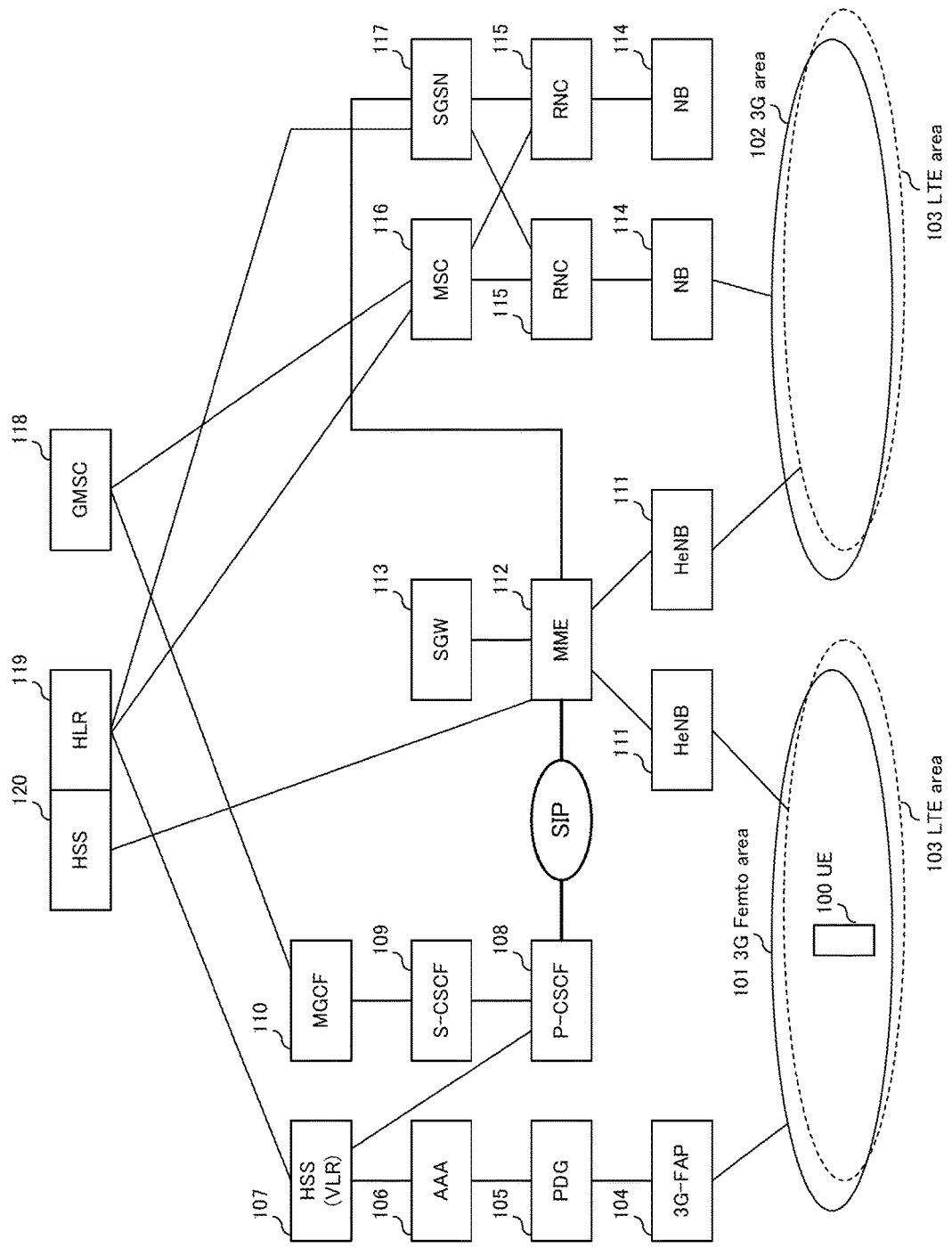
FIG. 1 A diagram illustrating a communication system according to an embodiment of the present invention.

FIG. 1 is a diagram illustrating a communication system according to an embodiment of the present invention.

As shown in FIG. 1, the communication system according to the embodiment includes UE (User Equipment) 100 having a LTE function, 3G-FAP (Femto Access Point) 104 that is a wireless base station having 3G femto area 101 set as a communication area, PDG (Packet Data Gateway) 105, AAA (Authentication Authorization Accounting) 106, HSS (Home Subscriber Server) (VLR (Visitors Location Register)) 107, P-CSCF (Proxy Call Session Control Function) 108, S-CSCF (Serving Call Session Control Function) 109, MGCF (Media Gateway Control Function) 110, HeNB (Home evolved Node B) 111 having LTE area 103 set as a communication area, MME (Mobility Management Entity) 112, SGW (Serving Gateway) 113, NB (Node B) 114 having 3G area 102 set as a communication area, RNC (Radio Network Controller) 115, MSC (Mobile Switching Center) 116, SGSN (Serving GPRS Support Node) 117, GMSC (Gateway Mobile-services Switching Center) 118, HLR (Home Location Register) 119, and HSS 120.

UE 100 is a 3G/LTE dual terminal having a 3G function and the LTE function.

NB 114, RNC 115, MSC 116 that is a switchboard, SGSN 117, GMSC 118, and HLR 119 constitute a 3G network. The processing operations of these components are similar to those of an existing system.

HeNB 111, MME 112, SGW 113, and HSS 120 constitute a LTE access network. The processing operations of HeNB 111, SGW 113, and HSS 120 are similar to those of the existing system. The LTE access network includes an eNB (evolved Node B). MME 112 serving as the control node of the LTE access network includes a SGs interface that is a switching interface for performing line switching with MSC 116 serving as the switchboard of the 3G network, and performs line switching (CSFB) of making a voice call or receiving a call from MME 112 to MSC 116. MME 112 simulates the aforementioned SGs interface with S-CSCF 109 by using a SIP protocol, and performs line switching (CSFB) of making a voice call or receiving a call from MME 112 to S-CSCF 109.

3G-FAP 104, PDG 105, AAA 106, HSS (VLR) 107, P-CSCF 108, S-CSCF 109, and MGCF 110 constitute a 3G femto network. PDG 105, AAA 106, HSS (VLR) 107, P-CSCF 108, S-CSCF 109, and MGCF 110 constitute an IMS (IP Multimedia Subsystem).

3G-FAP 104 is a compact wireless base station (femto cell base station) in which 3G femto area 101 having a radius of several tens of meters is set as a communication area.

PDG 105 is a communication device that securely relays a message.

AAA 106 is a device that performs authentication processing between UE 100 and the 3G femto network when UE 100 is present in 3G femto area 101.

HSS (VLR) 107 is a device that stores and manages the subscriber information of UE 100.

P-CSCF 108 and S-CSCF 109 are SIP servers that store, as SIP registration servers, the subscriber information downloaded from HSS (VLR) 107 or the current position information of a user, and controls the SIP protocol.

MGCF 110 is a gateway device that connects S-CSCF 109 to MGSC 118 that is a host device.

The form illustrated in FIG. 1 is an example where the CSFB from the LTE network to the 3G femto network according to the present invention is achieved by MME 112.

Figure 2:
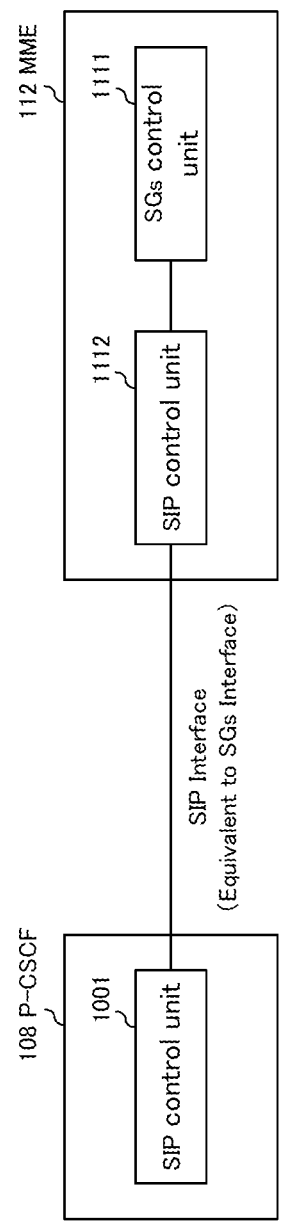
FIG. 2 A diagram illustrating an example of the internal configurations of a MME and a P-CSCF illustrated in FIG. 1.

FIG. 2 is a diagram illustrating an example of the internal configurations of MME 112 and P-CSCF 108 illustrated in FIG. 1. FIG. 2 illustrates only components related to the present invention among the internal components of MME 112 and P-CSCF 108 illustrated in FIG. 1.

MME 112 illustrated in FIG. 1 includes, as illustrated in FIG. 2, SGs control unit 1111 and SIP control unit 1112.

SGs control unit 1111 is an interface control unit that controls the SGs interface.

SIP control unit 1112 is a first SIP control unit that simulates the SGs interface controlled by SGs control unit 1111 by using a SIP, and controls line switching. SIP control unit 1112 transfers and receives the message of control information for line switching with SIP control unit 1001 during the line switching.

P-CSCF 108 illustrated in FIG. 1 includes SIP control unit 1001 as illustrated in FIG. 2.

SIP control unit 1001 is a second SIP control unit that controls line switching by using the SIP. SIP control unit 1001 constitutes virtual MSC means for causing MME 112 to recognize one MSC during communication with SIP control unit 1112 carried out by using the SIP interface. SIP control unit 1001 transfers and receives the message of control information for line switching with SIP control unit 1112 during the line switching.

The CSFB from the LTE network to the 3G femto network according to the present invention may be achieved by a conversion server.

Figure 3:
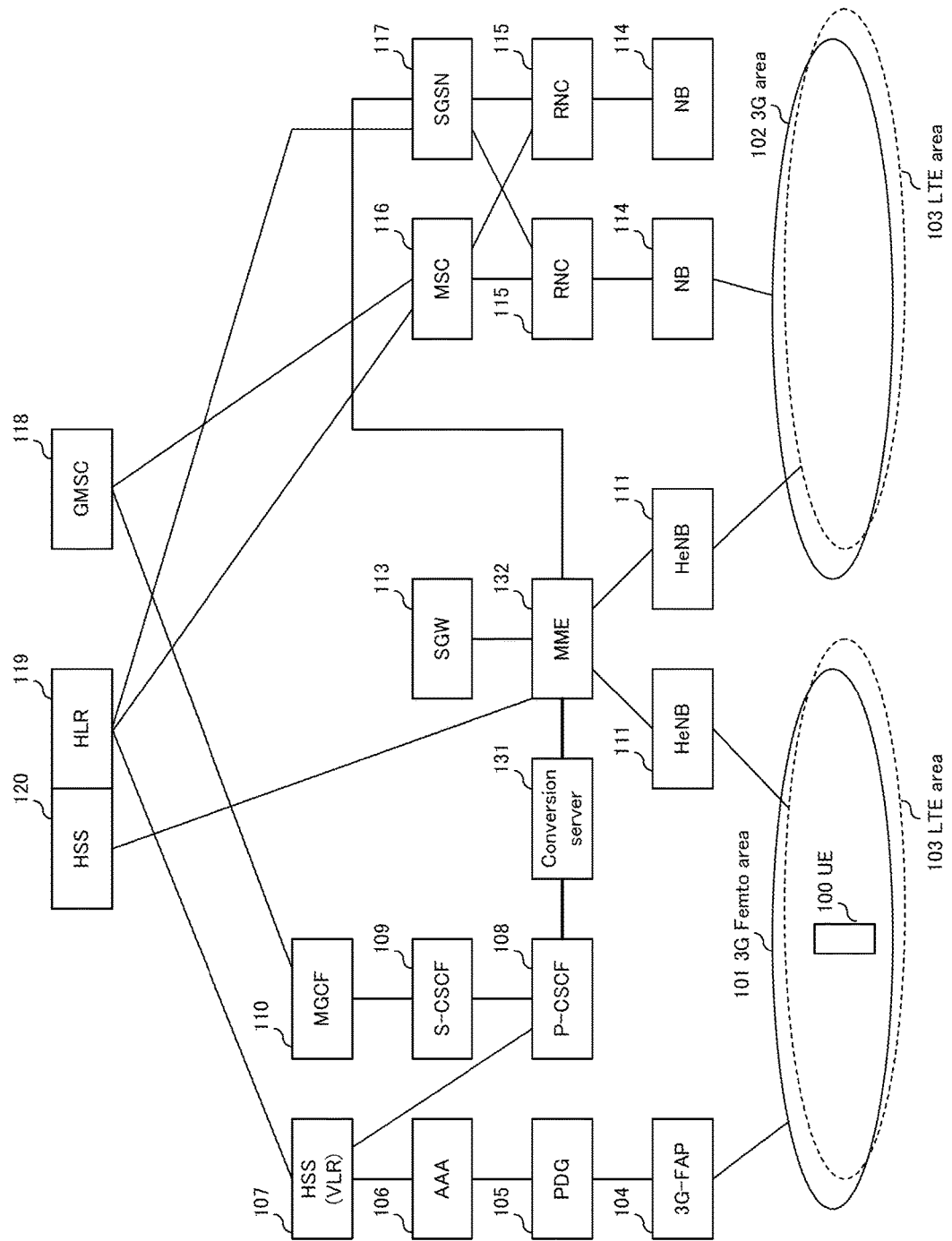
FIG. 3 A diagram illustrating a communication system according to another embodiment of the present invention.

FIG. 3 is a diagram illustrating a communication system according to another embodiment of the present invention.

As shown in FIG. 3, the communication system according to the embodiment includes UE 100, 3G-FAP 104 that is a wireless base station having 3G femto area 101 set as a communication area, PDG 105, AAA 106, HSS (VLR) 107, P-CSCF 108, S-CSCF 109, MGCF 110, HeNB 111 having LTE area 103 set as a communication area, MME 132, SGW 113, NB 114 having 3G area 102 set as a communication area, RNC 115, MSC 116, SGSN 117, GMSC 118, HLR 119, HSS 120, and conversion server 131. Components denoted by reference numerals similar to those illustrated in FIG. 1 perform operations similar to those illustrated in FIG. 1.

MME 132 controls a SGs interface.

Conversion server 131 is connected between P-CSCF 108 and MME 132, and simulates the SGs interface by using the SIP to control line switching.

Figure 4:
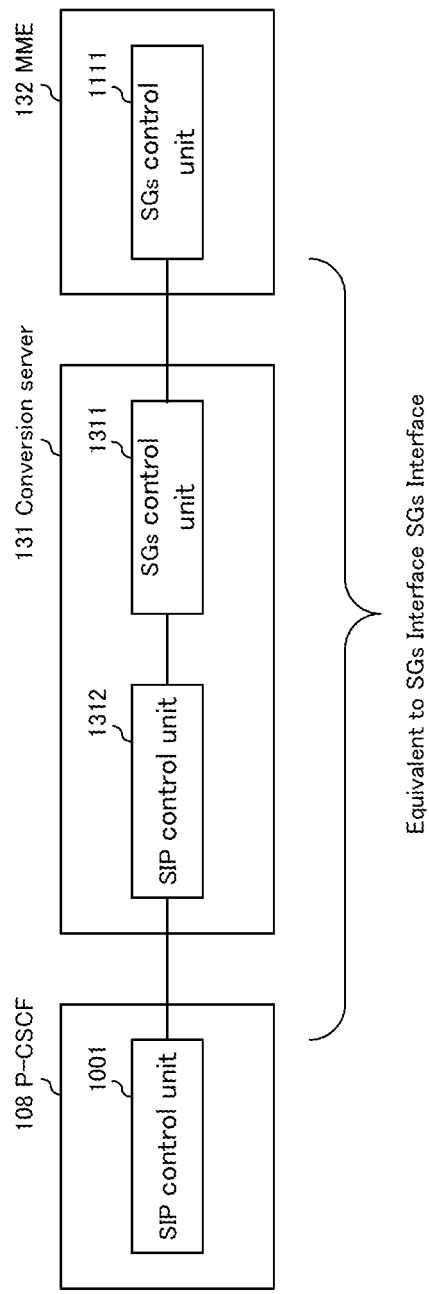
FIG. 4 A diagram illustrating an example of the internal configurations of a MME, a P-CSCF, and a conversion server illustrated in FIG. 3.

FIG. 4 is a diagram illustrating an example of the internal configurations of MME 132, P-CSCF 108, and conversion server 131 illustrated in FIG. 3. FIG. 4 illustrates only components related to the present invention among the internal components of MME 132, P-CSCF 108, and conversion server 131 illustrated in FIG. 3.

As illustrated in FIG. 4, MME 132 illustrated in FIG. 3 includes SGs control unit 1111. SGs control unit 1111 performs the same operation as that illustrated in FIG. 2.

Conversion server 131 illustrated in FIG. 3 includes, as illustrated in FIG. 4, SGs control unit 1311 and SIP control unit 1312.

SGs control unit 1311 is an interface control unit that controls the SGs interface with MME 132.

SIP control unit 1312 simulates the SGs interface controlled by SGs control unit 1311 by using the SIP, and controls line switching. SIP control unit 1312 transfers and receives the message of control information for line switching with SIP control unit 1001 during the line switching.

Hereinafter, a communication method in the communication system according to the present invention will be described. The communication method will be described based on the assumption that the function of simulating the SGs interface by using the SIP is provided as a dedicated GW (in MME 112 or conversion server 131). Each signal used for transferring and receiving information is pursuant to each protocol.

<Position Registration Processing>

Figure 5:
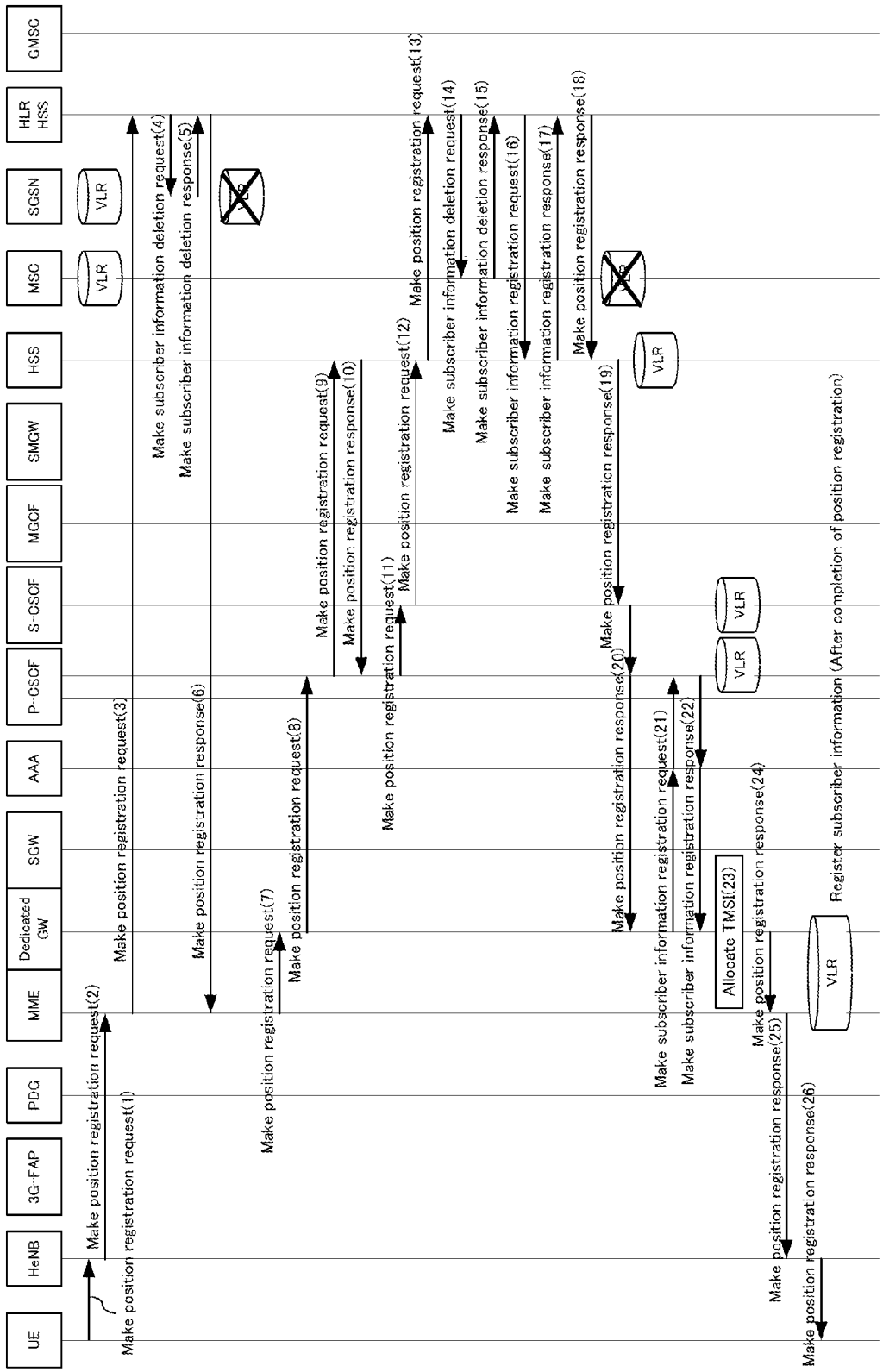
FIG. 5 A sequential diagram illustrating position registration processing of a UE according to a communication method in the communication system illustrated in FIG. 1.

FIG. 5 is a sequential diagram illustrating position registration processing of UE 100 according to the communication method in the communication system illustrated in FIG. 1.

First, UE 100 transmits EMM-Attach Request to HeNB 111 to make a position registration request (step 1). HeNB 111 that has received the EMM-Attach Request transmits SIAP-Initial UE Message [EMM-Attach Request] to MME 112 to make a position registration request (step 2).

Then, MME 112 transmits Dia-Update Location Request to HSS 120 to make a position registration request (step 3). Then, HLR 119 transmits MAP-Cancel Location Request to SGSN 117 to make a subscriber information deletion request (step 4). SGSN 117 that has received the MAP-Cancel Location Request deletes subscriber information of its own VLR, and transmits MAP-Cancel Location Response as a response to HLR 119 to make a subscriber information deletion response (step 5). Then, HLR 119 transmits Dia-Update Location Answer to MME 112 to make a position registration response (step 6).

MME 112 transmits SGsAP-Location Update Request to the dedicated GW to make a position registration request (step 7). Then, the dedicated GW transmits SIP-REGISTER to P-CSCF 108 to make a position registration request (step 8).

Subsequently, P-CSCF 108 transmits Dia-Cx-UAR to HSS 107 to make a position registration request (step 9). HSS 107 performs position registration processing, and transmits Dia-Cx-AAR as a response to P-CSCF 108 to make a position registration response (step 10).

Then, P-CSCF 108 transmits SIP-REGISTER to S-CSCF 109 to make a position registration request (step 11). S-CSCF 109 that has received the SIP-REGISTER transmits Dia-Cx-SAR to HSS 107 to make a position registration request (step 12). Then, HSS 107 transmits MAP-Update Location to HLR 119 to make a position registration request (step 13).

HLR 119 that has received the MAP-Update Location transmits MAP-Cancel Location Request to MSC 116 to make a subscriber information deletion request (step 14). MSC 116 that has received the MAP-Cancel Location Request deletes subscriber information of its own VLR, and transmits MAP-Cancel Location Response as a response to HLR 119 to make a subscriber information deletion response (step 15).

Then, HLR 119 transmits MAP-Insert Subscriber Data to HSS 107 to make a subscriber information registration request (step 16). HSS 107 that has received the MAP-Insert Subscriber Data registers subscriber information in its own VLR, and transmits MAP-Insert Subscriber Data Ack as a response to HLR 119 to make a subscriber information registration response (step 17).

Then, HLR 119 transmits MAP-Update Location Ack as a response to step 13 to HSS 107 to make a position registration response (step 18). HSS 107 that has received the MAP-Update Location Ack transmits Dia-Cx-SAA as a response to step 12 to S-CSCF 109 to make a position registration response (step 19).

Then, each of S-CSCF 109 and P-CSCF 108 performs position registration in its own VLR. P-CSCF 108 transmits SIP-200 OK as a response to step 8 to the dedicated GW to make a position registration response (step 20).

Subsequently, after the dedicated GW has transmitted SIP-SUBSCRIBER to P-CSCF 108, P-CSCF 108 registers subscriber information in its own VLR, and transmits SIP-200 OK as a response to the dedicated GW. The dedicated GW transmits SIP-NOTIFY to P-CSCF 108. P-CSCF 108 transmits SIP-200 OK as a response to the dedicated GW to make a subscriber information registration request (step 21) and to make a subscriber information registration response (step 22).

Then, the dedicated GW allocates TMSI (Temporary Mobile Subscriber Identity) that is a temporary identifier of UE 100 (step 23).

Subsequently, the dedicated GW transmits SGsAP-Location Update Accept as a response to step 7 to MME 112 to make a position registration response (step 24). MME 112 that has received the SGsAP-Location Update Accept transmits SIAP-Initial Context Setup Request [EMM-Attach Accept] as a response to step 2 to HeNB 111 to make a position registration request (step 25).

Then, HeNB 111 transmits EMM-Attach Accept as a response to step 1 to UE 100 to make a position registration response (step 26).

Then, EMM-Attach Complete is transmitted from UE 100 to HeNB 111. SIAP-Initial Context Setup Response is transmitted from HeNB 111 to MME 112. SGsAP-TMSI Relocation Complete is transmitted from MME 112 to the dedicated GW. Thus, after the completion of position registration, subscriber information is registered in the VLR of MME 112.

<CSFB Processing to 3G Femto Network When Voice Call Is Made from UE 100>

Figure 6A:
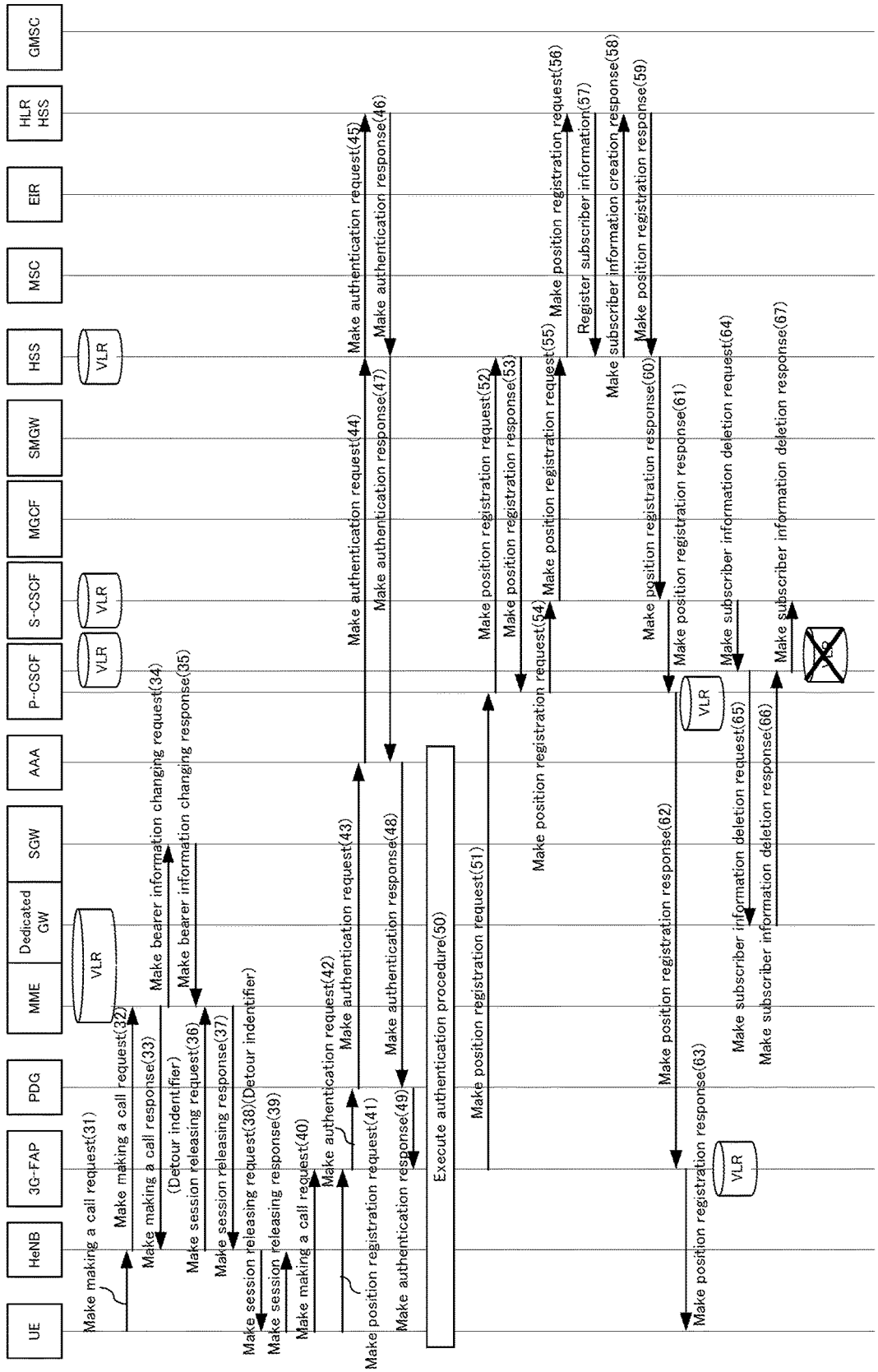
FIG. 6A A sequential diagram illustrating CSFB processing to a 3G femto network when a voice call is made from a UE present in a 3G femto area according to the communication method in the communication system illustrated in FIG. 1.
Figure 6B:
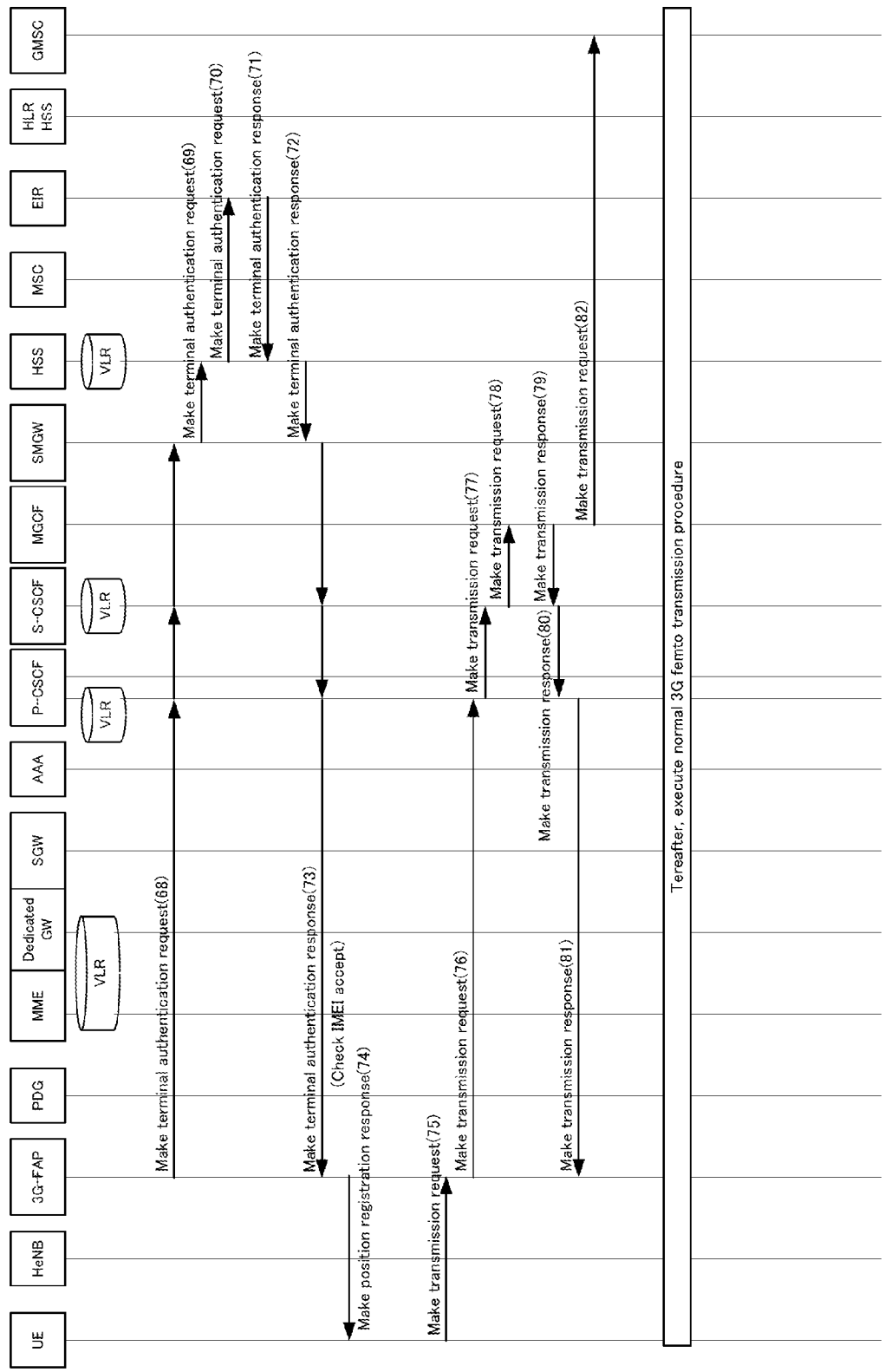
FIG. 6B A sequential diagram illustrating CSFB processing to the 3G femto network when the voice call is made from the UE present in the 3G femto area according to the communication method in the communication system illustrated in FIG. 1.

FIGS. 6A and 6B are sequential diagrams each illustrating CSFB processing to the 3G femto network when a voice call is made from UE 100 present in 3G femto area 101 according to the communication method in the communication system illustrated in FIG. 1.

First, UE 100 present in 3G femto area 101 transmits EMM-Extended service request to HeNB 111 to make a making a voice call request (step 31). HeNB 111 transmits SIAP-Initial UE Message to MME 112 to make a making a voice call request (step 32). MME 112 that has received the SIAP-Initial UE Message transmits SIAP-UE Context Setup Request to HeNB 111 to make a making a voice call response (step 33). For this response, CSFallback Indicator is used as a detour identifier.

Then, HeNB 111 transmits SIAP-UE Context Setup Response as a response to step 33 to MME 112. Then, MME 112 transmits GTPv2-Modify Bearer Request to SGW 113 to make a bearer information changing request (step 34). SGW 113 that has received the GTPv2-Modify Bearer Request transmits GTPv2-Modify Bearer Response as a response to MME 112 to make a bearer information changing response (step 35).

HeNB 111 transmits SIAP-51 UE Context Release Request to MME 112 to make a session releasing request (step 36). MME 112 that has received the SIAP-51 UE Context Release Request performs session releasing processing, and transmits SIAP-51 UE Context Release Command as a response to HeNB 111 to make a session releasing response (step 37).

Then, HeNB 111 transmits RRC Connection Release to UE 100 to make a session releasing request (step 38). For this request, CSFallback Indicator is used as a detour identifier. UE 100 that has received the RRC Connection Release makes a session releasing response as a response to HeNB 111 (step 39).

The procedure of steps 31 to 39 is standardized as a CSFB procedure according to 3GPP TS23.272 v 10.6.0.

HeNB 111 transmits, in response to step 37, a notification about the completion of session releasing as SIAP-S1 UE Context Release Complete to MME 112.

UE 100 transmits MM-CM Service Request to 3G-FAP 104 to make a making a voice call request (step 40). However, since UE 100 is an unidentified UE, 3G-FAP 104 transmits MM-CM Service Reject to UE 100 to reject the request.

Then, UE 100 transmits MM-Location Update Request to the 3G-FAP to make a position registration request (step 41). 3G-FAP 104 that has received the MM-Location Update Request transmits IDENTITY Request to request an identifier to UE 100. Then, UE 100 transmits IDENTITY Response as a response to 3G-FAP 104 to notify the identifier.

Then, 3G-FAP 104 transmits IKE-SA-INIT Req to PDG 105. PDG 105 that has received the IKE-SA-INIT Req transmits IKE-SA-INIT Res as a response to 3G-FAP 104. 3G-FAP 104 transmits IKE-AUTH Req to PDG 105 to make an authentication request (step 42). PDG 105 that has received the IKE-AUTH Req transmits Dia-EAP-Req to AAA 106 to make an authentication request (step 43). AAA 106 that has received the Dia-EAP-Req transmits Dia-Wx-MAR to HSS 107 to make an authentication request (step 44). Then, HSS 107 that has received the Dia-Wx-MAR transmits MAP-Send Authentication Info as authentication information to HLR 119 to make an authentication request (step 45).

HLR 119 that has received the MAP-Send Authentication Info transmits MAP-Send Authentication Info ack as a response to HSS 107 to make an authentication response (step 46). HSS 107 that has received the MAP-Send Authentication Info ack transmits Dia-Wx-MAA as a response to step 44 to AAA 106 to make an authentication response (step 47). Then, AAA 106 that has received the Dia-Wx-MAA transmits Dia-EAP-Ans as a response to step 43 to PDG 105 to make an authentication response (step 48). PDG 105 that has received the Dia-EAP-Ans transmits IKE-AUTH Res as a response to step 42 to 3G-FAP 104 to make an authentication response (step 49).

Then, an authentication procedure is performed (step 50).

Then, 3G-FAP 104 transmits SIP-REGISTER to P-CSCF 108 to make a position registration request (step 51). P-CSCF 108 transmits Dia-Cx-UAR to HSS 107 to make a position registration request (step 52). HSS 107 transmits Dia-Cx-UAA as a response to P-CSCF 108 to make a position registration response (step 53).

Then, P-CSCF 108 transmits the SIP-REGISTER to S-CSCF 109 to make a position registration request (step 54). S-CSCF 109 that has received the SIP-REGISTER transmits Dia-Cx-SAR to HSS 107 to make a position registration request (step 55).

Subsequently, HSS 107 that has received the Dia-Cx-SAR transmits MAP-Update Location to HLR 119 to make a position registration request (step 56).

HLR 119 transmits subscriber information to HSS 107 by using MAP-Insert Subscriber Data to perform subscriber information registration (step 57). HSS 107 that has registered (created) the subscriber information transmits MAP-Insert Subscriber Data ack as a response to HLR 119 to make a subscriber information creation response (step 58).

Then, HLR 119 transmits MAP-Update Location ack as a response to step 56 to HSS 107 to make a position registration response (step 59). HSS 107 that has received the MAP-Update Location ack transmits Dia-Cx-SAA as a response to step 55 to S-CSCF 109 to make a position registration response (step 60).

S-CSCF 109 that has received the Dia-Cx-SAA transmits SIP-200 OK as a response to step 54 to P-CSCF 108 to make a position registration response (step 61). P-CSCF 108 that has received the SIP-200 OK transmits the SIP-200 OK as a response to step 51 to 3G-FAP 104 to make a position registration response (step 62).

3G-FAP 104 transmits Security Mode Command to UE 100 to make a position registration response (step 63). UE 100 that has received the Security Mode Command transmits Security Mode Complete to 3G-FAP 104.

S-CSCF 109 transmits SIP-NOTIFY to P-CSCF 108 to make a subscriber information deletion request (step 64). P-CSCF 108 that has received the SIP-NOTIFY transmits the SIP-NOTIFY to the dedicated GW to make a subscriber information deletion request (step 65).

The dedicated GW transmits SIP-200 OK as a response to P-CSCF 108 to make a subscriber information deletion response (step 66). P-CSCF 108 that has received the SIP-200 OK deletes subscriber information from its own VLR, and transmits the SIP-200 OK to S-CSCF 109 to make a subscriber information deletion response (step 67).

Then, a terminal authentication request is made from 3G-FAP 104 to a SMGW via P-CSCF 108 and S-CSCF 109 (step 68). The SMGW makes a terminal authentication request to HSS 107 (step 69). HSS 107 that has received the terminal authentication request makes a terminal authentication request to an EIR (step 70). The EIR makes a terminal authentication response as a response to HSS 107 (step 71). HSS 107 that has received the terminal authentication response makes a terminal authentication response as a response to step 69 to the SMGW (step 72). The SMGW makes a terminal authentication response as a response to step 68 to 3G-FLAP 104 (step 73). These requests and responses are made by using signals of SIP-SUBSCRIBE, SIP-200 OK, SIP-NOTIFY, SIP-MESSAGE (Check IMEI, Check IMEI Accept), IMEI inv, MAP-Check IMEI inv, MAP-Check IMEI ack, IMEI res, and SIP-200 Accept.

3G-FLAP 104 transmits MM-Location Update Accept to UE 100 to make a position registration response (step 74). UE 100 transmits MM-TMSI Reallocation Complete to 3G-FLAP 104 to complete the position registration.

Then, UE 100 transmits MM-CM Service Request to 3G-FAP 104 to make a transmission request (step 75). 3G-FAP 104 transmits RRC-Security Mode Command to UE 100. Subsequently, UE 100 transmits RRC-Security Mode Complete to 3G-FAP 104. UE 100 transmits CC-SETUP to 3G-FAP 104. 3G-FAP 104 transmits SIP-INVITE to P-CSCF 108 to make a transmission request (step 76).

Subsequently, P-CSCF 108 that has received the SIP-INVITE transmits the SIP-INVITE to S-CSCF 109 to make a transmission request (step 77). S-CSCF 109 that has received the SIP-INVITE transmits SIP-INVITE to MGCF 110 to make a transmission request (step 78).

Then, MGCF 110 transmits SIP-100 Trying and SIP-183 Session/Progress/SDP to S-CSCF 109 to make a transmission response (step 79). S-CSCF 109 that has received the SIP-183 Session/Progress/SDP transmits the SIP-100 Trying and the SIP-183 Session/Progress/SDP to P-CSCF 108 to make a transmission response (step 80). P-CSCF 108 that has received the SIP-183 Session/Progress/SDP transmits the SIP-100 Trying and the SIP-183 Session/Progress/SDP to 3G-FAP 104 to make a transmission response (step 81). 3G-FAP 104 transmits CC-PROG (PI=1) to UE 100, and transmits SIP-PRACK to MGCF 110 via P-CSCF 108 and S-CSCF 109. MGCF 110 transmits SIP-200 OK to 3G-FAP 104 via S-CSCF 109 and P-CSCF 108. Then, 3G-FAP 104 transmits SIP-UPDATE/SDP to MGCF 110 via P-CSCF 108 and S-CSCF 109. MGCF 110 transmits SIP-200 OK to 3G-FAP 104 via S-CSCF 109 and P-CSCF 108.

MGCF 110 transmits IAM to GMSC 118 to make a transmission request (step 82).

Then, a normal 3G-Femto transmission procedure is carried out.

<CSFB Processing to 3G Network When Voice Call is Made from UE 100>

FIG. 7 is a sequential diagram illustrating CSFB processing to a 3G network when a voice call is made from UE 100 present in 3G area 102 according to the communication method in the communication system illustrated in FIG. 1.

First, UE 100 present in 3G area 102 transmits EMM-Extended service request to HeNB 111 to make a making a voice call request (step 91). HeNB 111 transmits SIAP-Initial UE Message to MME 112 to make a making a voice call request (step 92). MME 112 that has received the SIAP-Initial UE Message transmits SIAP-UE Context Setup Request to HeNB 111 to make a making a voice call response (step 93). For this response, CSFallback Indicator is used as a detour identifier.

Then, HeNB 111 transmits SIAP-UE Context Setup Response as a response to step 93 to MME 112. Then, MME 112 transmits GTPv2-Modify Bearer Request to SGW 113 to make a bearer information changing request (step 94). SGW 113 that has received the GTPv2-Modify Bearer Request transmits GTPv2-Modify Bearer Response as a response to MME 112 to make a bearer information changing response (step 95).

HeNB 111 transmits SIAP-51 UE Context Release Request to MME 112 to make a session releasing request (step 96). MME 112 that has received the SIAP-51 UE Context Release Request performs session releasing processing, and transmits SIAP-51 UE Context Release Command as a response to HeNB 111 to make a session releasing response (step 97).

Then, HeNB 111 transmits RRC Connection Release to UE 100 to make a session releasing request (step 98). For this request, CSFallback Indicator is used as a detour identifier. UE 100 that has received the RRC Connection Release makes a session releasing response as a response to HeNB 111 (step 99). HeNB 111 transmits SIAP-51 UE Context Release Complete to MME 112 to make a session releasing response (step 100).

The procedure of steps 91 to 100 is standardized as a CSFB procedure according to 3GPP TS23.272 v 10.6.0.

UE 100 transmits MM-CM Service Request to MCS 116 to make a making a voice call request (step 101). However, since UE 100 is an unidentified UE, MSC 116 transmits MM-CM Service Reject as a making a voice call response to UE 100 to reject the request (step 102).

Then, UE 100 transmits MM-Location Update Request to MSC 116 to make a position registration request (step 103). MSC 116 that has received the MM-Location Update Request transmits IDENTITY Request to request an identifier to UE 100. Then, UE 100 transmits IDENTITY Response as a response to MSC 116 to notify the identifier.

Then, an authentication procedure is performed (step 104).

Then, MSC 116 transmits MAP-Update Location to HLR 119 to make a position registration request (step 105). HLR 119 transmits MAP-Cancel Location to HSS 107 to make a subscriber information deletion request (step 106). Then, HSS 107 transmits Dia-Cx-RTR to S-CSCF 109 to make a subscriber deletion request (step 107). S-CSCF 109 makes a subscriber information deletion request to P-CSCF 108. P-CSCF 108 transmits SIP-NOTIFY to the dedicated GW to make a subscriber deletion request (step 108).

The dedicated GW that has received the SIP-NOTIFY transmits SIP-200 OK as a response to P-CSCF 108 to make a subscriber information deletion response (step 109). P-CSCF 108 that has received the SIP-200 OK deletes subscriber information from its own VLR, and makes a subscriber information deletion response to S-CSCF 109. S-CSCF 109 that has received the subscriber information deletion request from P-CSCF 108 deletes subscriber information from its own VLR, and transmits Dia-Cx-RTA to HSS 107 to make a subscriber information deletion response (step 110). HSS 107 that has received the Dia-Cx-RTA deletes subscriber information from its own VLR, and transmits MAP-Cancel Location Ack as a response to step 106 to HLR 119 to make a subscriber information deletion response (step 111).

Then, HLR 119 transmits MAP-Insert Subscriber Data to MSC 116 to perform subscriber information registration (step 112). MSC 116 performs subscriber registration processing in its own VLR, and transmits MAP-Insert Subscriber Data Ack as a response to step 112 to make a subscriber information registration response (step 113).

Subsequently, HLR 119 transmits MAP-Update Location Ack as a response to step 105 to MSC 116 to make a position registration response (step 114). HLR 119 transmits MM-Location Update Accept as a response to step 103 to MSC 116 to make a position registration response (step 115).

Then, UE 100 transmits MM-CM Service Request to MSC 116 to make a making a voice call request (step 116). MSC 116 transmits RRC-Security Mode Command to UE 100. UE 100 transmits RRC-Security Mode Complete to MSC 116. After UE 100 has transmitted CC-SETUP to MSC 116, MSC 116 transmits CC-CALL-PROC to UE 100.

Subsequently, MSC 116 transmits IAM to GMSC 118 to make a making a voice call request (step 117).

Then, a normal 3G transmission procedure is carried out.

<CSFB Processing to 3G Femto Network When Voice Call is Received by UE 100>

Figure 8B:
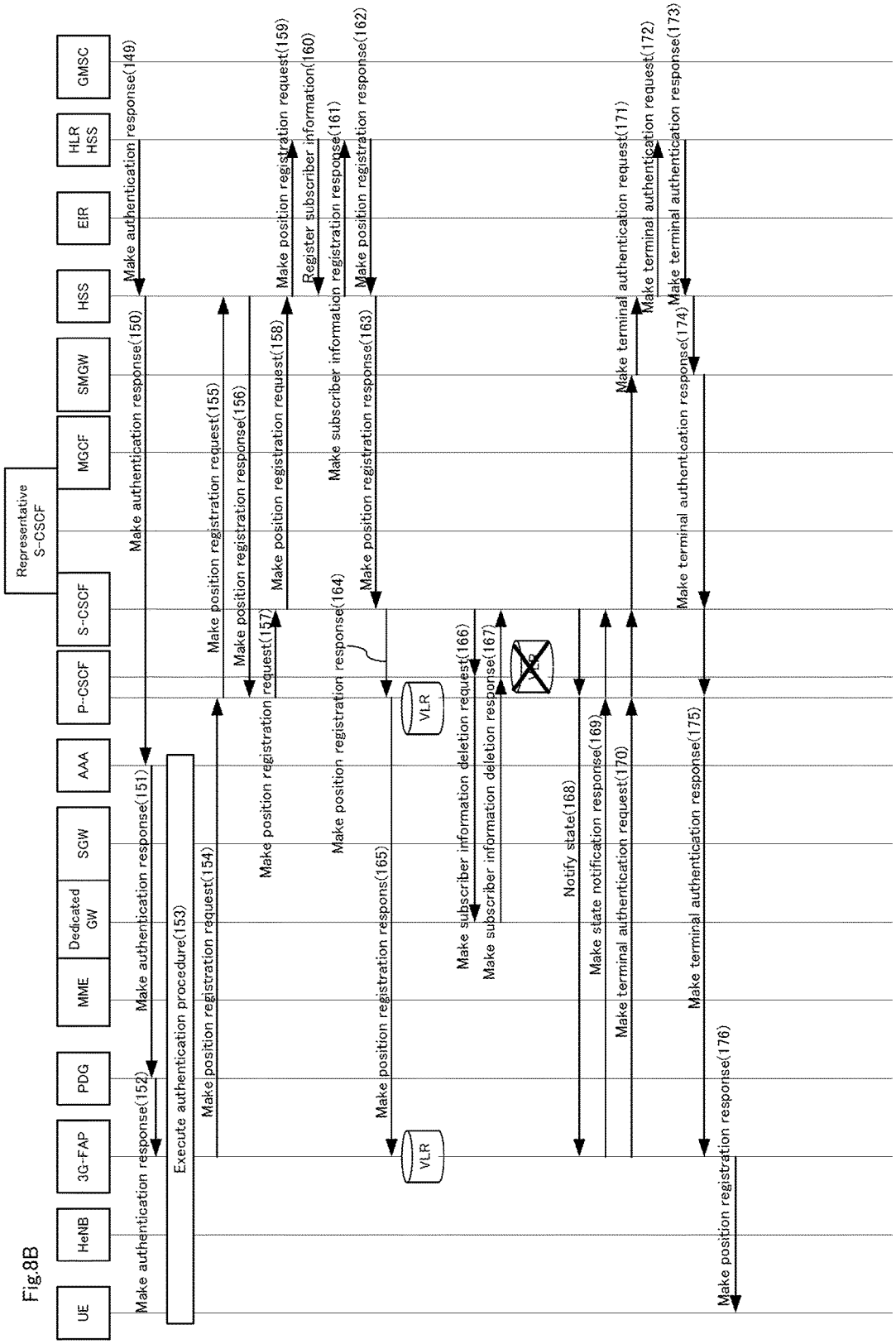
FIG. 8B A sequential diagram illustrating CSFB processing to the 3G femto network when the voice call is received by the UE that is present in the 3G femto area according to the communication method in the communication system illustrated in FIG. 1.
Figure 8C:
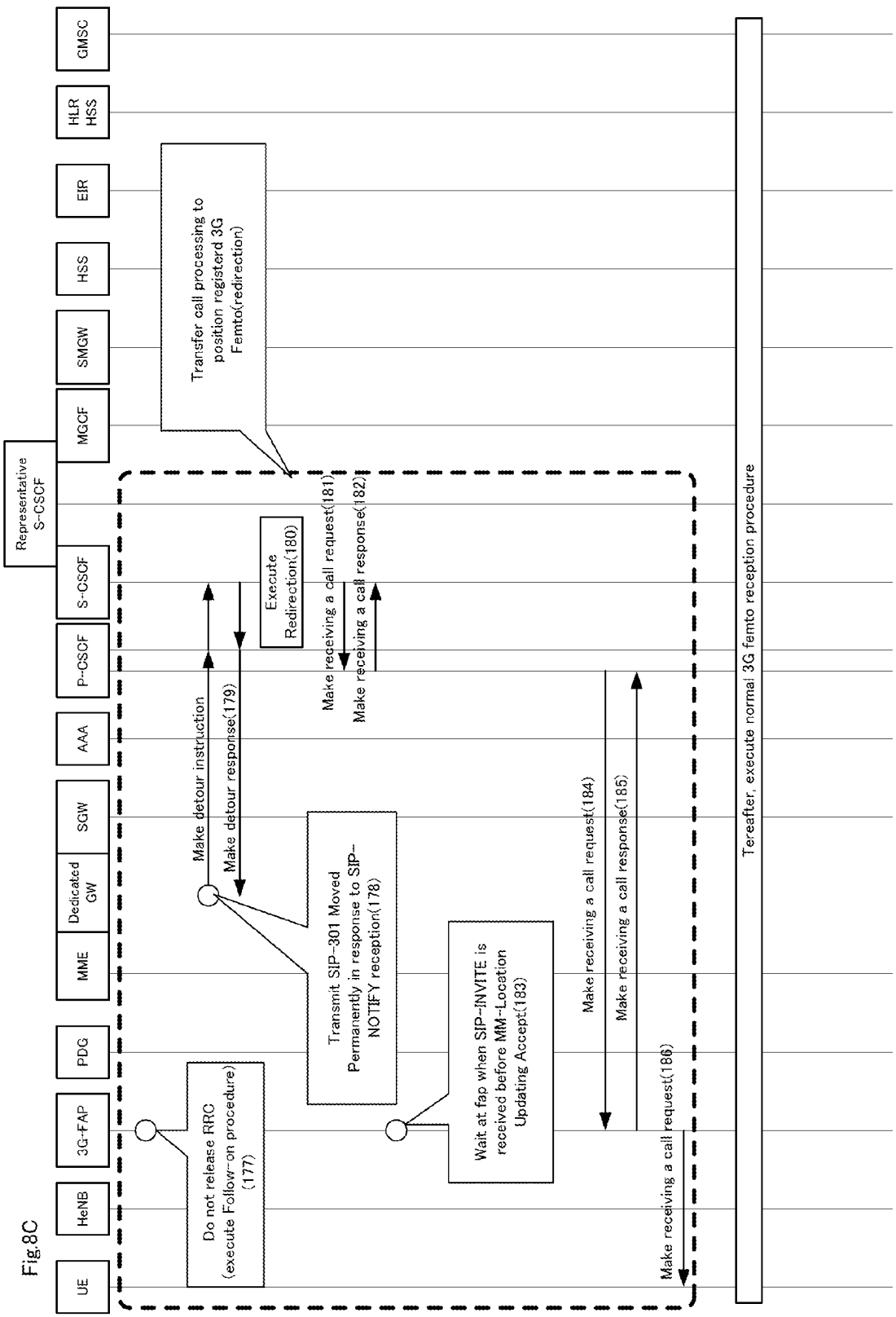
FIG. 8C A sequential diagram illustrating CSFB processing to the 3G femto network when the voice call is received by the UE that is present in the 3G femto area according to the communication method in the communication system illustrated in FIG. 1.

FIGS. 8A to 8C are sequential diagrams each illustrating CSFB processing to the 3G femto network when a voice call is received by UE 100 that is present in 3G femto area 101 according to the communication method in the communication system illustrated in FIG. 1.

First, when a voice call is received by UE 100 that is present in 3G femto area 101, GMSC 118 transmits IAM to MGCF 110 to make a receiving a voice call request (step 121). MGCF 110 transmits SIP-INVITE to a representative S-CSCF among S-CSCF to make a receiving a voice call request (step 122). Then, the representative S-CSCF transmits SIP-100 Trying to MGCF 110. The representative S-CSCF transmits Dia-Cx-LIR to HSS 107 to make a receiving a voice call request (step 123). HSS 107 transmits Dia-Cx-LIA to the representative S-CSCF to make a receiving a voice call response (step 124).

Then, the representative S-CSCF transmits SIP-INVITE to S-CSCF 109 to make a receiving a voice call request (step 125). S-CSCF 109 that has received the SIP-INVITE transmits SIP-100 Trying to the representative S-CSCF to make a receiving a voice call response (step 126). S-CSCF 109 transmits the SIP-INVITE to P-CSCF 108 to make a receiving a voice call request (step 127). P-CSCF 108 that has received the SIP-INVITE transmits the SIP-100 Trying to S-CSCF 109 to make a receiving a voice call response (step 128).

P-CSCF 108 transmits the SIP-INVITE to the dedicated GW to make a receiving a voice call request (step 129). The dedicated GW that has received the SIP-INVITE transmits the SIP-100 Trying to P-CSCF 108 to make a receiving a voice call response (step 130).

The dedicated GW transmits SGsAP-Paging Request to MME 112 to make a receiving a voice call request (step 131). A Service Indicator used here is a CS call indicator. MME 112 that has received the SGsAP-Paging Request transmits SIAP-Paging to HeNB 111 to make a receiving a voice call request (step 132). Then, HeNB 111 transmits RRC-Paging to UE 100 to make a receiving a voice call request (step 133).

A procedure thus far is a reception procedure at UE 100 present in LTE area 103.

UE 100 that has received the RRC-Paging transmits EMM-Extended service request to HeNB 111 to make a receiving a voice call request (step 134). A Service type is mobile terminating CS fallback.

Subsequently, HeNB 111 transmits SIAP-Initial UE Message [EMM-Extended service request] to MME 112 to make a receiving a voice call request (step 135). MME 112 transmits SGsAP-Service Request to the dedicated GW to make a receiving a voice call request (step 136). A service indicator used here is a CS call indicator.

MME 112 transmits SIAP-Initial Context Setup Request to HeNB 111 to make a receiving a voice call response (step 137). An identifier used here is a CS fallback indicator. HeNB 111 transmits SIAP-Initial Context Setup Response to MME 112.

Subsequently, MME 112 transmits GTPv2-Modify Bearer Request to SGW 113 to make a bearer information changing request (step 138). SGW 113 that has received the GTPv2-Modify Bearer Request transmits GTPv2-Modify Bearer Response as a response to MME 112 to make a bearer information changing response (step 139).

Then, HeNB 111 transmits SIAP-UE Context Release Request to MME 112 to make a session releasing request (step 140). MME 112 transmits SIAP-UE Context Release Command to HeNB 11 to make a session releasing response (step 141). HeNB 111 transmits RRC-RRC Connection Release to UE 100 to make a session releasing request (step 142). UE 110 makes a session releasing response to HeNB 111 (step 143). HeNB 111 transmits SIAP-UE Context Release Complete as a session releasing completion notification to MME 112.

The procedure of steps 135 to 143 is standardized as a CSFB procedure according to 3GPP TS23.272 v10.6.0.

Then, UE 100 transmits MM-Location Updating Request to 3G-FAP 104 to make a position registration request (step 144). Here, the CSMT of Additional update parameters is 1. 3G-FAP 104 makes an authentication request of UE 100 to PDG 105 (step 145). This authentication request is achieved in a manner that 3G-FAP 104 transmits IKE- SA-INIT Req to PDG 105, PDG 105 transmits IKE-SA-INIT Res to 3G-FAP 104, and 3G-FAP 104 transmits IKE-AUTH Req to PDG 105.

Subsequently, PDG 105 transmits Dia-EAP-Req to AAA 106 to make an authentication request (step 146). AAA 106 transmits Dia-Wx-MAR to HSS 107 to make an authentication request (step 147). HSS 107 transmits MAP-Send-Authentication Info to HLR 119 (HSS 120) to make an authentication request (step 148).

Then, HLR 119 (HSS 120) transmits MAP-Send-Authentication Info ack to HSS 107 to make an authentication response (step 149). HSS 107 transmits Dia-Wx-MAA as a response to step 147 to AAA 106 to make an authentication response (step 150). AAA 106 that has received the Dia-Wx-MAA transmits Dia-EAP-Ans as a response to step 146 to PDG 105 to make an authentication response (step 151). PDG 105 transmits IKE-AUTH Res as a response to step 145 to 3G-FAP 104 to make an authentication response (step 152).

Then, an authentication procedure is carried out (step 153).

Then, 3G-FAP 104 transmits SIP-REGISTER to P-CSCF 108 to make a position registration request (step 154). P-CSCF 108 that has received the SIP-REGISTER transmits Dia-Cx-UAR to HSS 107 to make a position registration request (step 155). Then, HSS 107 transmits Dia-Cx-UAA as a response to P-CSCF 108 to make a position registration response (step 156).

Subsequently, P-CSCF 108 transmits the SIP-REGISTER to S-CSCF 109 to make a position registration request (step 157). S-CSCF 109 that has received the SIP-REGISTER transmits Dia-Cx-SAR to HSS 107 to make a position registration request (step 158). Then, HSS 107 transmits MAP-Update Location to HLR 119 (HSS 120) to make a position registration request (step 159).

Then, HLR 119 transmits MAP-Insert Subscriber Data to HSS 107 to perform subscriber information registration (step 160). HSS 107 performs registration processing of the subscriber information, and transmits MAP-Insert Subscriber Data Ack as a response to HLR 119 to make a subscriber information registration response (step 161).

Subsequently, HLR 119 transmits MAP-Update Location Ack as a response to step 159 to HSS 107 to make a position registration response (step 162). HSS 107 transmits Dia-Cx-SAA as a response to step 158 to S-CSCF 109 to make a position registration response (step 163). S-CSCF 109 transmits SIP-200 OK as a response to step 157 to P-CSCF 108 to make a position registration response (step 164). P-CSCF 108 that has received the SIP-200 OK transmits the SIP-200 OK as a response to step 154 to 3G-FAP 104 to make a position registration response (step 165).

3G-FAP 104 transmits RRC-Security Mode Command to UE 100. UE 100 transmits RRC-Security Mode Complete to 3G-FAP 104.

S-CSCF 109 transmits SIP-NOTIFY to the dedicated GW via P-CSCF 108 to make a subscriber information deletion request (step 166). The dedicated GW transmits SIP-200 OK as a response to S-CSCF 109 via P-CSCF 108 to make a subscriber information deletion response (step 167). Here, P-CSCF 108 deletes subscriber information from its own VLR.

Then, S-CSCF 109 notifies 3G- FAP 104 of a state via P-CSCF 108 (step 168). 3G-FAP 104 makes a state notification response as a response to S-CSCF 109 via P-CSCF 108 (step 169). For the state notification and the state notification response, SIP-SUBSCRIBE, SIP-200 OK, and SIP-NOTIFY are used.

Subsequently, 3G-FAP 104 transmits SIP-MESSAGE to the SMGW via P-CSCF 108 and S-CSCF 109 to make a terminal authentication request (step 170). The SMGW transmits IMEI iry to HSS 107 to make a terminal authentication request (step 171). The SMGW transmits SIP-202 Accept to 3G-FAP 104. HSS 107 transmits MAP-Check IMEI inv to HLR 119 to make a terminal authentication request (step 172). HLR 119 transmits MAP-Check IMEI ack as a response to HSS 107 to make a terminal authentication response (step 173). Then, HSS 107 transmits IMEI res as a response to step 171 to the SMGW to make a terminal authentication response (step 174). The SMGW transmits SIP-MESSAGE (Check IMEI accept) to 3G-FAP 104 via S-CSCF 109 and P-CSCF 108 to make a terminal authentication response (step 175). Then, 3G-FAP 104 transmits SIP-200 OK to the SMGW via P-CSCF 108 and S-CSCF 109.

Subsequently, 3G-FAP 104 transmits MM-Location Updating Accept to UE 100 to make a position registration response (step 176). UE 100 transmits MM-TMSI Reallocation Complete to 3G-FAP 104.

The processing of steps 144 to 176 is a position registration procedure to the 3G femto network.

Then, 3G-FAP 104 carries out a Follow-on procedure (step 177). Here, 3G-FAP 104 does not release the RRC.

The dedicated GW transmits SIP-301 Moved Permanently to S-CSCF 109 via P-CSCF 108 in response to SIP -NOTIFY reception to instruct detouring (step 178). Then, S-CSCF 109 transmits SIP-ACK to the dedicated GW via P-CSCF 108 to make a detour response (step 179).

Subsequently, S-CSCF 109 transfers (redirects) call processing to the position-registered 3G femto network (step 180). S-CSCF 109 transmits SIP-INVITE to P-CSCF 108 to make a receiving a voice call request (step 181). P-CSCF 108 transmits SIP-100 Trying to S-CSCF 109 to make a receiving a voice call response (step 182).

3G-FAP 104 waits at the FAP when the SIP-INVITE is received before the MM-Location Updating Accept (step 183).

Then, P-CSCF 108 transmits the SIP-INVITE to 3G-FAP 104 to make a receiving a voice call request (step 184). 3G-FAP 104 transmits SIP-100 Trying to P-CSCF 108 to make a receiving a voice call response (step 185).

3G-FAP 104 transmits CC-SETUP to UE 100 to make a receiving a voice call request (step 186).

Then, a normal 3G-Femto reception procedure is carried out.

<CSFB Processing to 3G Network When Voice Call is Received by UE 100>

FIGS. 9A and 9B are sequential diagrams each illustrating CSFB processing to the 3G network when a voice call is received by UE 100 that is present in 3G area 102 according to the communication method in the communication system illustrated in FIG. 1.

First, when a voice is received by UE 100 that is present in 3G area 102, GMSC 118 transmits IAM to MGCF 110 to make a receiving a voice call request (step 191). MGCF 110 transmits SIP-INVITE to a representative S-CSCF among S-CSCF to make a receiving a voice call request (step 192). Then, the representative S-CSCF transmits SIP-100 Trying to MGCF 110 to make a receiving a voice call response (step 193). The representative S-CSCF transmits Dia-Cx-LIR to HSS 107 to make a receiving a voice call request (step 194). HSS 107 transmits Dia-Cx-LIA to the representative S-CSCF to make a receiving a voice call response (step 195).

Then, the representative S-CSCF transmits SIP-INVITE to S-CSCF 109 to make a receiving a voice call request (step 196). S-CSCF 109 that has received the SIP-INVITE transmits SIP-100 Trying to the representative S-CSCF to make a receiving a voice call response (step 197). S-CSCF 109 transmits the SIP-INVITE to P-CSCF 108 to make a receiving a voice call request (step 198). P-CSCF 108 that has received the SIP-INVITE transmits the SIP-100 Trying to S-CSCF 109 to make a receiving a voice call response (step 199).

P-CSCF 108 transmits the SIP-INVITE to the dedicated GW to make a receiving a voice call request (step 200). The dedicated GW that has received the SIP-INVITE transmits the SIP-100 Trying to P-CSCF 108 to make a receiving a voice call response (step 201).

The dedicated GW transmits SGsAP-Paging Request to MME 112 to make a receiving a voice call request (step 202). A Service Indicator used here is a CS call indicator. MME 112 that has received the SGsAP-Paging Request transmits S 1AP-Paging to HeNB 111 to make a receiving a voice call request (step 203). Then, HeNB 111 transmits RRC-Paging to UE 100 to make a receiving a voice call request (step 204).

A procedure thus far is a reception procedure at UE 100 present in LTE area 103.

UE 100 that has received the RRC-Paging transmits EMM-Extended service request to HeNB 111 to make a receiving a voice call request (step 205). A Service type is mobile terminating CS fallback.

Subsequently, HeNB 111 transmits SIAP-Initial UE Message [EMM-Extended service request] to MME 112 to make a receiving a voice call request (step 206). MME 112 transmits SGsAP-Service Request to the dedicated GW to make a receiving a voice call request (step 207). A service indicator used here is a CS call indicator.

MME 112 transmits SIAP-Initial Context Setup Request to HeNB 111 to make a receiving a voice call response (step 208). An identifier used here is a CS fallback indicator that is a detour identifier. HeNB 111 transmits SIAP-Initial Context Setup Response to MME 112 to make a receiving a voice call response (step 209).

Subsequently, MME 112 transmits GTPv2-Modify Bearer Request to SGW 113 to make a bearer information changing request (step 210). SGW 113 that has received the GTPv2-Modify Bearer Request transmits GTPv2-Modify Bearer Response as a response to MME 112 to make a bearer information changing response (step 211).

Then, HeNB 111 transmits SIAP-UE Context Release Request to MME 112 to make a session releasing request (step 212). MME 112 transmits SIAP-UE Context Release Command to HeNB 11 to make a session releasing response (step 213). HeNB 111 transmits RRC-RRC Connection Release to UE 100 to make a session releasing request (step 214). UE 110 makes a session releasing response to HeNB 111 (step 215). HeNB 111 transmits SIAP-UE Context Release Complete as a session releasing completion notification to MME 112.

The procedure of steps 206 to 215 is standardized as a CSFB procedure according to 3GPP TS23.272 v10.6.0.

Then, UE 100 transmits MM-Location Updating Request (CSMT of Additional update parameters is 1) to MSC 116 to make a position registration request (step 216). MSC 116 transmits MM-Identity Request to UE 100 to make an identification request (step 217). UE 100 that has received the MM-Identity Request transmits MM-Identity Response to MSC 116 to make an identification response (step 218).

Subsequently, MSC 116 transmits MAP-Send-Authentication Info to HLR 119 to make an authentication request of UE 100 (step 219). HLR 119 that has received the MAP-Send-Authentication Info transmits MAP-Send-Authentication Info ack as a response to MSC 116 to make an authentication response (step 220). MSC 116 transmits MM-Authentication Request to UE 100 to make an authentication request (step 221). UE 100 that has received the MM-Authentication Request transmits MM-Authentication Response as a response to MSC 116 to make an authentication response (step 222).

Subsequently, MSC 116 transmits MAP-Update Location to HLR 119 to make a position registration request (step 223). HLR 119 transmits MAP-Cancel Location to HSS 107 to make a subscriber information deletion request (step 224). HSS 107 transmits MAP-Cancel Location ack to HLR 119 to make a subscriber information deletion response (step 225).

Then, HLR 119 transmits MAP-Insert Subscriber Data to MSC 116 to perform subscriber information registration (step 226). MSC 116 transmits MAP-Insert Subscriber Data ack as a response to HLR 119 to make a subscriber information registration response (step 227). Then, HLR 119 transmits MAP-Update Location ack as a response to step 223 to MSC 116 to make a position registration response (step 228). MSC 116 that has received the MAP-Update Location ack transmits MM-Location Updating accept as a response to step 216 to UE 100 to make a position registration response (step 229). UE 100 transmits MM-TMSI Relocation Complete to MSC 116, and MSC 116 registers subscriber information in its own VLR.

The processing of steps 216 to 229 is a position registration procedure to the 3G network.

Then, HSS 107 transmits Dia-Cx-RTR to S-CSCF 109 to make a subscriber information deletion request (step 230). S-CSCF 109 transmits SIP-NOTIFY to the dedicated GW via P-CSCF 108 to make a subscriber information deletion request (step 231). The dedicated GW transmits SIP-200 OK as a response to S-CSCF 109 via P-CSCF 108 to make a subscriber information deletion response (step 232). S-CSCF 109 transmits Dia-Cx-RTA as a response to step 230 to HSS 107 to make a subscriber information deletion response (step 233). Accordingly, each of P-CSCF 108, S-CSCF 109, and HSS 107 deletes subscriber information from its own VLR.

The dedicated GW transmits SIP-301 Moved Permanently to S-CSCF 109 via P-CSCF 108 in response to SIP-NOTIFY reception to instruct detouring (step 234). Then, S-CSCF 109 transmits SIP-ACK to the dedicated GW via P-CSCF 108 to make a detour response (step 235).

Subsequently, S-CSCF 109 transfers (redirects) call processing to the position-registered 3G network (step 236).

The processing of steps 234 to 236 is call transfer processing (redirection) to the 3G network.

Then, S-CSCF 19 transmits SIP-INVITE to MGCF 110 to make a receiving a voice call request (step 237). MGCF 110 transmits SIP-100 Trying to S-CSCF 109 to make a receiving a voice call response (step 238).

MGCF 110 transmits IAM to GMSC 118 to make a receiving a voice call request (step 239). GMSC 118 transmits MAP-Send Routing Info to HLR 119 to make a receiving a voice call request (step 240). HLR 119 that has received the MAP -Send Routing Info transmits MAP-Provide Roaming Number to MSC 116 to make a receiving a voice call request (step 241). Then, MSC 116 transmits MAP-Provide Roaming Number ack as a response to HLR 119 to make a receiving a voice call response (step 242). HLR 119 transmits MAP-Send Routing Info ack as a response to step 240 to GMSC 118 to make a receiving a voice call response (step 243).

Subsequently, GMSC 118 transmits IAM to MSC 116 to make a receiving a voice call request (step 244). MSC 116 transmits CC-SETUP to UE 100 to make a receiving a voice call request (step 245). UE 100 transmits CC-CALL CONF to MSC 116 to make a receiving a voice call response (step 246). Then, MSC 116 that has received the CC-CALL CONF makes a receiving a voice call response to MGCF 110 (step 247). MGCF 110 makes a receiving a voice call response to HLR 119 (step 248).

Thus, in the state of presence at the 3G/LTE dual terminal present in both the areas, namely, the LTE area and the 3G femto area, when a voice call is made from the 3G/LTE dual terminal or a voice call is received by the 3G/LTE dual terminal, the SGs interface used for the CSFB between the 3G network and the LTE network is simulated by the SIP. As a result, the making a voice call from the 3G/LTE dual terminal or receiving a voice call at the 3G/LTE dual terminal can be subjected to CSFB to the 3G femto network.

Some or all parts of the aforementioned embodiments may be described as in the appendixes below, which are in no way limitative.

(Appendix 1)

A communication system comprising:

a LTE access network including a control node, an eNB, and a HeNB; and a 3G femto network including an IMS and a femto cell base station, wherein:

the IMS includes virtual MSC means for causing the control node to recognize a server in the IMS as a MSC during communication with the control node; and the virtual MSC means transfers and receives a message of control information for line switching with the control node during the line switching between the eNB and the femto cell base station, and between the HeNB and the femto cell base station.

(Appendix 2)

The communication system according to Appendix 1, wherein the virtual MSC means causes the control node to recognize the server in the IMS as the MSC by using a predetermined protocol.

(Appendix 3)

The communication system according to Appendix 2, wherein:
the protocol is a SIP; and
the server is a SIP server.

(Appendix 4)

The communication system according to Appendix 3, wherein:
the control node includes:
an interface control unit that controls the switching interface; and
a first SIP control unit that controls, by using the SIP, the line switching of the switching interface controlled by the interface control unit; and
the SIP server includes a second SIP control unit that controls the line switching by using the SIP.

(Appendix 5)

The communication system according to Appendix 3, wherein:
the control node and the SIP server are connected to each other via a conversion server; and
the conversion server includes:
an interface control unit that controls the switching interface with the control node; and
a SIP control unit that controls, by using the SIP, the line switching of the switching interface controlled by the interface control unit with the SIP server.

(Appendix 6)

A control node of a LTE access network comprising:
an interface control unit that controls a switching interface for performing line switching from the control node to an IMS with the IMS of a 3G femto network when a voice call is made from a 3G/LTE dual terminal present in both areas, namely, a communication area of the 3G femto network and a communication area of a LTE network, or when a voice call is received by the 3G/LTE dual terminal; and
a SIP control unit that controls the line switching with the IMS by using a SIP.

(Appendix 7)

A conversion server comprising:
an interface control unit that controls a switching interface for performing line switching from a control node to an IMS of a 3G femto network with the control node of a LTE access network when a voice call is made from a 3G/LTE dual terminal present in both areas, namely, a communication area of the 3G femto network and a communication area of a LTE network, or when a voice call is received by the 3G/LTE dual terminal; and
a SIP control unit that controls the line switching with the IMS by using a SIP.

(Appendix 8)

A communication method comprising the steps of:
determining whether a voice call has been made from a 3G/LTE dual terminal present in both areas, namely, a communication area of a 3G femto network and a communication area of a LTE network, or whether a voice call has been received by the 3G/LTE dual terminal; and
when it is determined that the voice call has been made or that the voice call has been received, performing line switching of the making a voice call or the receiving a voice call from a control node of a LTE access network to an IMS of the 3G femto network by using a predetermined protocol.

The embodiments of the present invention have been described. However, the present invention is not limited to the embodiments. Various changes understandable to those skilled in the art can be made to the configuration and the specifics of the present invention without departing from the scope of the invention.

This application claims priority from Japanese Patent Application No. 2012-129835 filed Jun. 7, 2012, which is hereby incorporated by reference herein in its entirety.

The invention claimed is:

1. A communication system comprising:
a Long Term Evolution (LTE) access network including a control node, an evolved Node B (eNB), and a Home evolved Node B (HeNB); and
a 3G femto network including an Internet Protocol Multimedia System (IMS) and a femto cell base station, wherein:
the IMS includes a virtual Mobile Switching Center (MSC) for causing the control node to recognize a server in the IMS as a MSC during communication with the control node;
the virtual MSC transfers and receives a message of control information for line switching with the control node during the line switching between the eNB and the femto cell base station, and between the HeNB and the femto cell base station;
the virtual MSC causes the control node to recognize the server in the IMS as the MSC by using a predetermined protocol;
the protocol is a Session Initiation Protocol (SIP);
the server is a SIP server; and
the control node includes:
an interface control unit that controls the switching interface;
a first SIP control unit that controls, by using the SIP, the line switching of the switching interface controlled by the interface control unit; and
the SIP server includes a second SIP control unit that controls the line switching by using the SIP.

2. A communication system comprising:
a Long Term Evolution (LTE) access network including a control node, an evolved Node B (eNB), and a Home evolved Node B (HeNB); and
a 3G femto network including an Internet Protocol Multimedia System (IMS) and a femto cell base station, wherein:
the IMS includes virtual Mobile Switching Center (MSC) for causing the control node to recognize a server in the IMS as a MSC during communication with the control node;
the virtual MSC transfers and receives a message of control information for line switching with the control node during the line switching between the eNB and the femto cell base station, and between the HeNB and the femto cell base station;
the virtual MSC causes the control node to recognize the server in the IMS as the MSC by using a predetermined protocol;
the protocol is a Session Initiation Protocol (SIP);
the server is a SIP server;
the control node and the SIP server are connected to each other via a conversion server; and
the conversion server includes:

an interface control unit that controls the switching interface with the control node; and a SIP control unit that controls, by using the SIP, the line switching of the switching interface controlled by the interface control unit with the SIP server.

3. A control node of a Long Term Evolution (LTE) access network comprising:

an interface control unit that controls a switching interface for performing line switching from the control node to an Internet Protocol Multimedia System (IMS) with the IMS of a 3G femto network when a voice call is made from a 3G/LTE dual terminal present in both areas, namely, a communication area of the 3G femto network and a communication area of a LTE network, or when a voice call is received by the 3G/LTE dual terminal; and a first Session Initiation Protocol (SIP) control unit that controls the line switching with the IMS by using a SIP; wherein the IMS includes virtual Mobile Switching Center (MSC) for causing the control node to recognize a SIP server in the IMS as a MSC during communication with the control node; and the SIP server includes a second SIP control unit that controls the line switching by using the SIP.

4. A conversion server comprising:

an interface control unit that controls a switching interface for performing line switching from a control node to an Internet Protocol Multimedia System (IMS) of a 3G femto network with the control node of a Long Term Evolution (LTE) access network when a voice call is made from a 3G/LTE dual terminal present in both areas, namely, a communication area of the 3G femto network and a communication area of a LTE network, or when a voice call is received by the 3G/LTE dual terminal; and a Session Initiation Protocol (SIP) control unit that controls the line switching with the IMS by using a SIP; wherein the IMS includes virtual Mobile Switching Center (MSC) for causing the control node to recognize a SIP server in the IMS as a MSC during communication with the control node;

the control node and the SIP server are connected to each other via the conversion server.

* * * * *